US012743552B2

(12) United States Patent
Bozdag et al.

(10) Patent No.: US 12,743,552 B2
(45) Date of Patent: Sep. 22, 2026

(54) SYSTEMS AND METHODS FOR SELECTIVELY ANONYMIZING TARGETED DATA ENTRIES

(71) Applicant: Uber Technologies, Inc., San Francisco, CA (US)

(72) Inventors: Veli Engin Bozdag, Austin, TX (US); Daniel Eynis, Seattle, WA (US); Nimish Gupta, Seattle, WA (US); Mohammad Kamrul Islam, Sunnyvale, CA (US); Lei Sun, Seattle, WA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 22 days.

(21) Appl. No.: 18/902,668

(22) Filed: Sep. 30, 2024

(65) Prior Publication Data

US 2026/0093846 A1 Apr. 2, 2026

(51) Int. Cl.

| | |
|---|---|
| ***G06F 21/62*** | (2013.01) |
| ***G06F 40/205*** | (2020.01) |
| ***G06F 40/284*** | (2020.01) |
| ***G06F 40/295*** | (2020.01) |
| ***G06F 40/30*** | (2020.01) |

(52) U.S. Cl.

CPC ........ *G06F 21/6254* (2013.01); *G06F 40/205* (2020.01); *G06F 40/284* (2020.01); *G06F 40/295* (2020.01); *G06F 40/30* (2020.01)

(58) Field of Classification Search

CPC .. G06F 21/6254; G06F 40/284; G06F 40/205; G06F 40/295; G06F 40/30

See application file for complete search history.

(56) References Cited

U.S. PATENT DOCUMENTS

| | | | | |
|---|---|---|---|---|
| 10,311,092 | B2 * | 6/2019 | Ganjam | G06F 40/216 |
| 10,504,050 | B1 * | 12/2019 | Rogynskyy | H04L 12/14 |
| 10,983,960 | B2 * | 4/2021 | Faith | G06Q 30/0631 |
| 11,127,403 | B2 | 9/2021 | Medalion et al. | |
| 11,455,316 | B2 * | 9/2022 | Abdul Rasheed | G06F 11/1469 |

(Continued)

OTHER PUBLICATIONS

Microsoft Presidio, "Presidio: Data Protection and De-identification SDK", https://microsoft.github.io/presidio/, retrieved on Dec. 27, 2024, 3 pages.

(Continued)

*Primary Examiner* — Hosuk Song
(74) *Attorney, Agent, or Firm* — Dority & Manning, P.A.

(57) ABSTRACT

Systems and methods for anonymizing targeted data entries. A method includes accessing a dataset comprising targeted data and parsing the dataset into a plurality of data entities. The method includes detecting a plurality of targeted data entries among the plurality of parsed data entities and determining a confidence score associated with each of the plurality of targeted data entries. The method includes determining at least two overlapping targeted data entries and determining at least one contained targeted data entry. The method further includes determining a subset of targeted data entries each having a confidence score below a threshold confidence score and removing at least one targeted data entry. The method includes converting remaining targeted data entries of the plurality of targeted data entries to anonymized data entries.

20 Claims, 8 Drawing Sheets

(56) References Cited

U.S. PATENT DOCUMENTS

| | | | | |
|---|---|---|---|---|
| 11,726,822 | B2 * | 8/2023 | Brebner | G06F 9/5027<br>703/2 |
| 11,782,944 | B2 * | 10/2023 | Abdul Rasheed | G06F 16/254<br>707/602 |
| 11,810,131 | B2 * | 11/2023 | Rodkey | G06Q 40/10 |
| 12,079,737 | B1 * | 9/2024 | Biswas | G06F 16/26 |
| 12,449,973 | B2 * | 10/2025 | Cooper | G06F 3/0671 |

OTHER PUBLICATIONS

Microsoft Presidio, “Presidio Analyzer”, https://microsoft.github.io/presidio/analyzer/, retrieved on Dec. 27, 2024, 3 pages.

Microsoft Presidio, “Presidio Design”, https://microsoft.github.io/presidio/design/, retrieved on Dec. 27, 2024, 2 pages.

Microsoft Presidio, “Presidio Anonymizer”, https://microsoft.github.io/presidio/anonymizer/, retrieved on Dec. 27, 2024, 7 pages.

* cited by examiner

SYSTEMS AND METHODS FOR SELECTIVELY ANONYMIZING TARGETED DATA ENTRIES

FIELD

The present disclosure generally relates to selectively anonymizing targeted data. More particularly, the present disclosure is related to accessing records for anonymizing data, parsing the data, and pruning the data before passing the data to a receiving computing entity.

BACKGROUND

Data anonymization can include processing techniques that remove or modify certain information from data sets so that it cannot be associated with any one individual or entity. This process can protect information by, for example, encrypting identifiers that may form connections to stored data.

SUMMARY

Aspects and advantages of embodiments of the present disclosure will be set forth in part in the following description, or can be learned from the description, or can be learned through practice of the embodiments.

One aspect of the present disclosure is directed to a computing system. The computing system includes one or more processors and one or more tangible, non-transitory, computer readable media that store instructions that are executable by the one or more processors to cause the computing system to perform operations. The operations include accessing a dataset comprising targeted data. The operations include parsing the dataset into a plurality of data entities. The operations include detecting, using one or more filters, a plurality of targeted data entries among the plurality of parsed data entities. The operations include determining a confidence score associated with each of the plurality of targeted data entries. The operations include determining at least two overlapping targeted data entries, wherein each overlapping targeted data entry comprises targeted data entries. The operations include determining at least one contained targeted data entry, wherein the at least one contained targeted data entry comprises a portion of a related targeted data entry. The operations include determining a subset of targeted data entries each having a confidence score below a threshold confidence score. The operations include removing, from the plurality of targeted data entries: one or more of the at least two overlapping targeted data entries; the at least one contained targeted data entry; and the subset of targeted data entries. The operations include converting remaining targeted data entries of the plurality of targeted data entries to anonymized data entries, wherein each of the anonymized data entries is devoid of the targeted data.

In some implementations, the operations comprise: identifying a semantic attribute of each of the targeted data entries.

In some implementations, converting the remaining targeted data entries of the plurality of targeted data entries to the anonymized data entries comprises associating, based on the respective semantic attribute, at least one corresponding semantic identifier to each of the remaining targeted data entries.

In some implementations, the operations comprise: identifying, based on the semantic attribute of a first targeted data entry, a semantic relationship between the first targeted data entry and a second targeted data entry.

In some implementations, parsing the dataset into the plurality of data entities comprises parsing the dataset into a plurality of tokens, lemmas, or keywords.

In some implementations, parsing the dataset into the plurality of data entities comprises detecting contextual information within the dataset using Named-Entity-Recognition (NER).

In some implementations, determining the confidence score associated with each respective targeted data entry of the plurality of targeted data entries comprises: identifying at least one entity type associated with the respective targeted data entries; transmitting the at least one entity type and the respective targeted data entries to a trained model; and receiving, from the trained model, the confidence score associated with the respective targeted data entry of the plurality of targeted data entries.

In some implementations, the operations comprise: mapping associations between the remaining targeted data entries and the anonymized data entries; and generating data indicating the associations between the remaining targeted data entries and the anonymized data entries.

In some implementations, the operations comprise: receiving a set of filter sensitivities associated with each respective filter of the one or more filters, wherein detecting the plurality of targeted data entries among the plurality of parsed data entities comprises applying the set of filter sensitivities to the one or more filters.

In some implementations, the operations comprise: accessing, within a separate configuration file, one or more detectors configured to detect the plurality of targeted data entries among the plurality of parsed data entities.

In some implementations, the operations comprise: receiving, via the separate configuration file, user selection configured to update the one or more detectors; and updating, based on the user selection, the one or more detectors.

In some implementations, detecting the plurality of targeted data entries among the plurality of parsed data entities comprises: hashing each targeted data entry with a plurality of hash functions; assigning, based on the plurality of hash functions, a value to corresponding bits in a bit array; and determining, using the value of corresponding bits in the bit array, the plurality of targeted data entries.

In some implementations, determining the confidence score associated with each of the plurality of targeted data entries comprises: determining, for each of the plurality of targeted data entries, one or more context elements within a threshold number of elements from the respective targeted data entry; determining, for each of the one or more context elements, an associated tag type; and modifying, based on a number of determined context elements or based on the tag type of the one or more context elements, the confidence score of the corresponding targeted data entry.

Another example aspect of the present disclosure is directed to a computer-implemented method. The method includes accessing a dataset comprising targeted data. The method includes parsing the dataset into a plurality of data entities. The method includes detecting, using one or more filters, a plurality of targeted data entries among the plurality of parsed data entities. The method includes determining a confidence score associated with each of the plurality of targeted data entries. The method includes determining a subset of targeted data entries each having a confidence score below a threshold confidence score. The method includes removing, from the plurality of targeted data entries, the subset of targeted data entries. The method includes converting remaining targeted data entries of the plurality of targeted data entries to anonymized data entries, wherein each of the anonymized data entries is devoid of the targeted data. The method includes mapping associations between the remaining targeted data entries and the anonymized data entries.

In some implementations, the method comprises: identifying a semantic attribute of each of the targeted data entries.

In some implementations, converting the remaining targeted data entries of the plurality of targeted data entries to the anonymized data entries comprises associating, based on the respective semantic attribute, at least one corresponding semantic identifier to each of the remaining targeted data entries.

In some implementations, the method comprises: identifying, based on the semantic attribute of a first targeted data entry, a semantic relationship between the first targeted data entry and a second targeted data entry.

Yet another example aspect of the present disclosure is directed to another computer-implemented method. The method includes parsing a dataset into a plurality of tokens, lemmas, or keywords. The method includes generating a plurality of data entities based on the plurality of tokens, lemmas, or keywords. The method includes detecting, using one or more filters, a plurality of targeted data entries among the plurality of parsed data entities. The method includes determining a confidence score associated with each of the plurality of targeted data entries. The method includes determining a subset of targeted data entries each having a confidence score below a threshold confidence score. The method includes removing, from the plurality of targeted data entries, the subset of targeted data entries. The method includes converting remaining targeted data entries of the plurality of targeted data entries to anonymized data entries. The method includes generating data indicating associations between the remaining targeted data entries and the anonymized data entries.

In some implementations, detecting the plurality of targeted data entries among the plurality of data entities comprises: hashing each targeted data entry with a plurality of hash functions; and assigning, based on the plurality of hash functions, a value to corresponding bits in a bit array; and determining, using the value of corresponding bits in the bit array, the plurality of targeted data entries.

In some implementations, determining the confidence score associated with each of the plurality of targeted data entries comprises: determining, for each of the plurality of targeted data entries, one or more context elements within a threshold number of elements from the respective targeted data entry; determining, for each of the one or more context elements, an associated tag type; and modifying, based on a number of determined context elements or based on the tag type of the one or more context elements, the confidence score of the corresponding targeted data entry.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
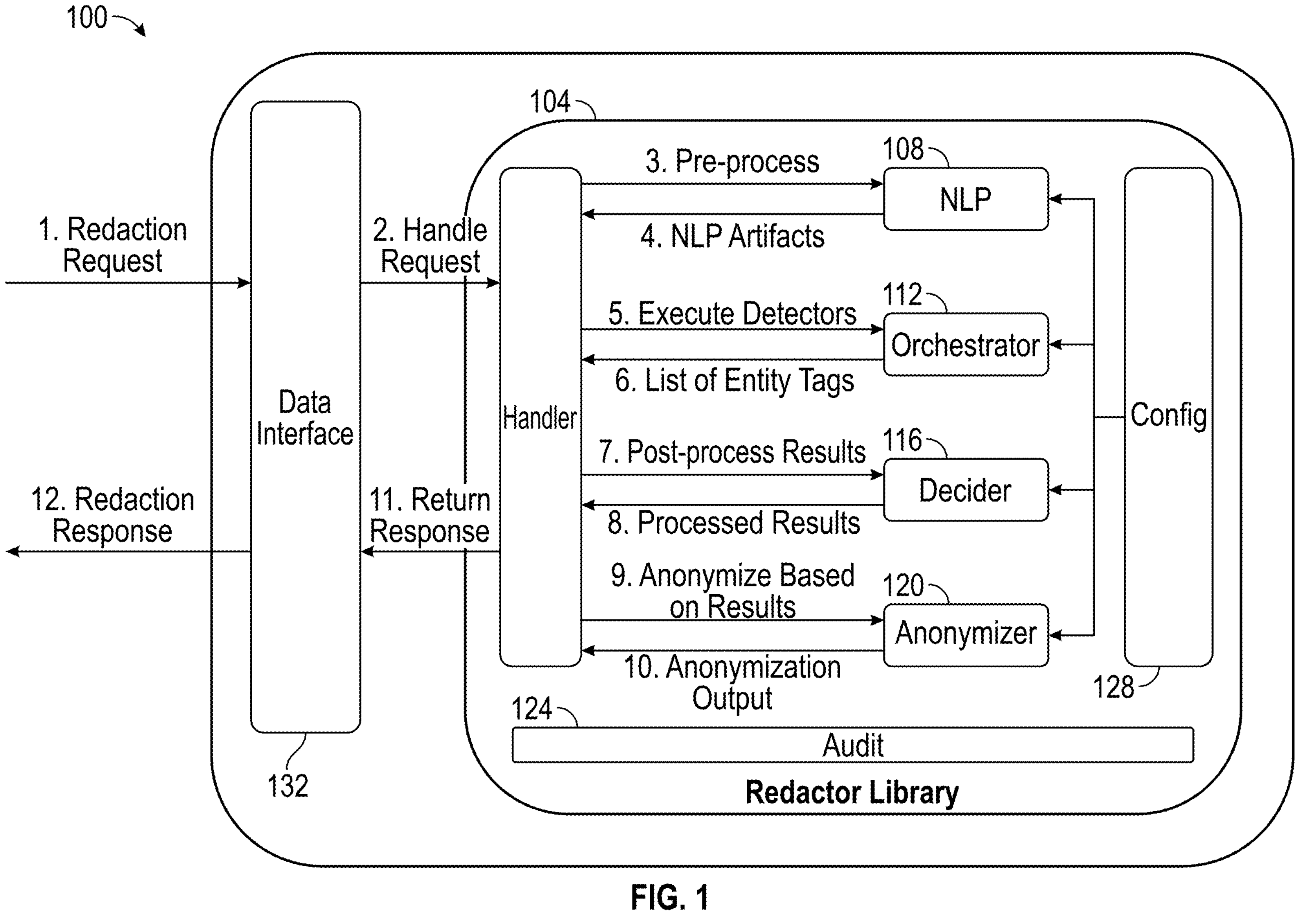
FIG. 1 depicts a block diagram of an example system for converting targeted data entries to anonymized data entries, according to example aspects of the present disclosure.

Generally, the present disclosure is directed to systems and methods for improving computing systems that detect, redact, or anonymize targeted data, such as sensitive data. Such techniques may provide additional security measures for an entity in possession of large sets of data, and in particular, protect data before it is shared with another entity. For example, the technology of the present disclosure can access certain records and the underlying data and anonymize the data before passing or sharing the data to a receiving computing entity for some business purpose. A receiving computing entity can be, for example, an unaffiliated entity, such that the entity in possession of the data may want to take protective measures before sharing such data. The system can parse the data into tokens, lemmas, keywords, or other data entities. The system can pass the parsed data into one or more filters that can detect sensitive entity data for anonymization. The detected entity data can be pruned by the system to remove duplicate entity data, merge over lapping entity data, or remove low-confidence entity data. After filtering the entity data, the system can anonymize the data. The anonymized data can retain certain data characteristics, such as a feature of the entity data or a relationship of the entity data to other data in a dataset (e.g., document). The present disclosure allows for redacting or otherwise obfuscating targeted data before transmitting the data to a receiving entity.

The technology of the present disclosure has application in a variety of contexts. One example implementation includes detecting, redacting, or anonymizing targeted data before it can be transmitted to a receiving computing entity. In some instances, personal or other sensitive data is difficult to distinguish from non-sensitive data amid large datasets, yet such sensitive data (e.g., user data) is frequently at risk for being disclosed accidentally by a receiving computing entity. Due to the risks of disclosing such targeted data, it can be advantageous to improve existing computing systems in the way that they censor, de-identify, redact, or otherwise anonymize such data. Other contexts include requirements (e.g., policies, guidelines, regulations, agreements) that specify how data should be handled internally or externally.

In some implementations, a centralized or dedicated system can be used to detect or redact targeted data per data handling guidelines. Such data handling guidelines can be according to a country or state law, municipal law, contractual agreement (e.g., service level agreements (SLAs), employee agreements, litigation stipulations, etc.), or internal protocols or operating guidelines. Redacting or otherwise anonymizing targeted data (e.g., personally identifying information) in a dataset can enable safe use of such data while respecting user privacy and privacy laws and regulations or other requirements.

Embodiments described herein can access a dataset including targeted data and parse it into a plurality of data entities. Using filters, the system can detect a plurality of targeted data entries among the plurality of parsed data entities and determine a confidence score associated with each of the plurality of targeted data entries.

In some embodiments, the system can also determine overlapping targeted data entries or contained targeted data entries. Overlapping targeted data entries can include data entries where a portion of the data entry is included in another data entry. For example, the data entry "WASHINGTON STREET" overlaps with another data entry "GEORGE WASHINGTON".

Overlapping data entries can be distinguished from data entries that are contained in other data entries. A contained data entry can include a data entry that is fully included in another data entry. For example, the data entry "WASHINGTON" is contained in the data entry "WASHINGTON STREET".

The system can determine a confidence score of the targeted data entries. The confidence score may be based, for example, on an entity type of the targeted data entry. The entity type may include name, phone number, email address, passport number, driver's license number, street address, and the like. Additionally or alternatively, the context may be based on a number or type of context elements within a threshold number of elements from the respective targeted data entry. In some embodiments, the system can remove overlapping and/or contained targeted data entries as well as targeted data entries having a confidence score below a threshold confidence score. Remaining targeted data entries of the plurality of targeted data entries can be anonymized. Anonymized data entries can be stripped of target content, such as personally identifying or other sensitive data.

Targeted data (e.g., sensitive data) creates challenges for computing systems in part because it can be stored in various forms and structures. This variability can create technical challenges for processing engines that can be configured for limited data types, forms, or structures and may have challenges properly interfacing with certain data. As another example, identifying false positives and false negatives can be difficult due to the variability in how this type of data may be stored. Achieving a balance between minimizing false positives (e.g., flagging non-sensitive data as sensitive) and false negatives (e.g., missing actual sensitive data) can provide technical hurdles. Further, the dynamic nature of data sources and the continuous generation of new types of data presents unending challenges for computing systems to properly interface with certain data. In this way, the systems and methods described herein provide a technical solution to technical problems introduced by data anonymization. For example, the technology of the present disclosure can access certain records and the underlying data and anonymize the data before passing the data to a receiving computing entity. The system can parse the data into tokens, lemmas, keywords, or other data entities and pass the parsed data into one or more filters. After filtering the entity data, the system can anonymize the data while retaining certain data characteristics, such as a feature of the entity data or a relationship of the entity data to other data in a dataset (e.g., document)

The technology disclosed herein provides a variety of technical improvements to computing systems, such as by providing solutions to the problems identified above. For example, the systems described herein can provide improved accuracy of identification of targeted data. Embodiments described herein can manage data with high variability. For example, embodiments described herein can identify false positives and false negatives, achieving a balance between reducing or minimizing false positives and false negatives. Further, embodiments described herein can adjust to the dynamic nature of data sources and the continuous generation of new types of sensitive data. Embodiments described herein can improve computing systems to integrate technical aspects of new data sources while also anticipating updated data types.

As a further improvement to computing systems, embodiments disclosed herein can preserve certain utility of data to be anonymized. For example, the systems disclosed herein can preserve a semantic nature (e.g., semantic meaning, semantic identifier) of the data while redacting or anonymizing the sensitive nature of the data. Additionally, or alternatively, the systems can preserve complex relationships among elements within the datasets without risking loss of the connections among those elements. The systems described herein can balance this preserved data utility while maintaining the anonymity of the data whose utility is being maintained.

As yet another example of how the systems described herein can improve the functioning of existing computing systems, embodiments described herein can handle unusually large volumes of data while maintaining data or other resource constraints on the system. In some embodiments, constraints can include timing constraints (e.g., latency reduction), data transmission constraints, or data handling guidelines (e.g., SLA requirements, etc.). Some of these constraints can be dynamic in nature and require adjustments (e.g., in near real-time adjustments) to these constraints without disclosing the targeted data. Embodiments described herein provide for example embodiments to illustrate how these technical benefits are achieved.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

FIG. 1 depicts a block diagram of an example anonymizing system for converting targeted data entries to anonymized data entries, according to certain embodiments. FIG. 1 depicts an anonymizing system 100 with various components. The components can be implemented as software/code that is programmed as instructions in memory for execution by computing hardware such as processors, servers, or the like. The components can share at least some computing hardware or be implemented on separate computing hardware.

The anonymizing system 100 can include one or more of a redactor library 104 and a data interface 132. The redactor library 104 can include a handler 106, a natural language processor 108, an orchestrator 112, a decider 116, an anonymizer 120, an auditor 124, or a config 128. The redactor library 104 can store redaction features or develop them as a library so that the features can be used from multiple contexts, such as from a service in an online manner or inside a batch job for offline processing.

The data interface 132 can receive a redaction request, such as from a remote computing system (not shown in FIG. 1) or other system. The data interface 132 can make the redaction service accessible to clients within a closed system, such as the anonymizing system 100.

The data interface 132 can translate the request received over a distributed system (e.g., via remote procedure calls) to be compatible with the redactor library. For example, the data interface 132 can parse the redaction request and identify one or more parameters, such as: one or more data types to be redacted, a set of redaction rules to be applied, or any user-defined settings. The data interface 132 can convert these parameters into a format understood by the redactor library 104. Additionally or alternatively, the data interface 132 can ensure that relevant details are correctly mapped. For example, if the redaction request uses a different schema or data format (e.g., JSON, XML), the data interface 132 can transform these formats into the specific API calls or data structures expected by the redactor library 104. Additionally or alternatively, the data interface 132 can handle any necessary authentication or validation checks to confirm that the redaction request complies with security protocols before forwarding it to the redactor library 104. Once translated, the redaction request can be processed by the redactor library 104, as described herein.

Additionally or alternatively, the response from the redactor library 104 can be sent over remote procedure call to the client. The data interface 132 can pass the request to the handler 106 for anonymizing data within the request or related data. The handler 106 can be agnostic of the technology used or agnostic of the client system. The client system can be a service or a library. It interfaces with other modules within the redactor library 104 to drive the redaction process. The handler 106 can send the data associated with the request to the natural language processor 108 for pre-processing.

The natural language processor 108 can convert the received request into one or more data elements. The natural language processor 108 can process the received text for tokenization, lemmatization, or entity extraction. This Named Entity Recognition (NER) can be a way for the natural language processor 108 to convert the data from one format to another format. The outputs from the natural language processor 108 can include the natural language processing (NLP) artifacts (e.g., tokens, lemmas, entities, etc.), which can be used to inform detectors in the anonymizing system 100 so that the detectors can act on this information. The output from the natural language processor 108 may additionally or alternatively be used by a context-based enhancer described below to boost a score associated with one or more of the extracted entities, based on their presence among certain context words or other data around the extracted entity. The natural language processor 108 can transmit the NLP artifacts back to the handler 106 for further processing.

In response to receiving the NLP artifacts, the handler 106 can determine that the NLP artifacts should be tagged. Accordingly, the handler 106 can pass one or more of the NLP artifacts to the orchestrator 112 to execute detectors on the NLP artifacts. The orchestrator 112 can be a computer module for executing the detectors on the received text, which can include the identified NLP artifacts. The orchestrator 112 returns a list of detected entities, which can include associated start indices, end indices, or confidence scores. The orchestrator 112 can send a list of the determined entity tags to the handler 106.

The handler 106 can send the determined entity tags or the detected NLP artifacts to the decider 116. The decider 116 can perform a post-processing step for processing the list of detected entities to remove overlapping, contained, or low-confidence results (e.g., entities). The decider 116 may additionally or alternatively transmit the associated entity tags to the decider 116. The decider 116 can transmit the remaining entities to the handler 106. The handler 106 can transmit the remaining entities or associated entity tags to the anonymizer 120.

The anonymizer 120 can receive the remaining entities or associated entity tags from the handler 106 in order to anonymize one or more of the remaining entities or associated entity tags. The anonymizer 120 can use the post-processed results from the decider 116 and anonymize the input text based on a target anonymization strategy. A first anonymization strategy can include masking. Another strategy can include hashing. A third strategy can include encryption. Other strategies are possible. For example, the following input can be transformed:

Input: My name is John Johnson and my email is john@johnson.com

Output: my Name Is Anonymized_name_0 and my Email Is ANONYMIZED_EMAIL_ADDRESS_1

The data can be anonymized while retaining one or more semantic attributes of the anonymized data. For example, the anonymizing system 100 can retain data associated with the anonymized data, such as an associated semantic identifier or other semantic attribute of one or more of the anonymized data entries.

After the data is anonymized, the anonymizer 120 can send the anonymized data to the handler 106. The handler 106 can receive the anonymized data and transmit it to the data interface 132 for transmission to a computing device, such as a remote computing device. In some embodiments, the output can include an indication of a mapping between the anonymized data and a masking of the anonymized data. The indication of the mapping can include an anonymization report, which can indicate the anonymized data, the underlying data, or entity tags associated with the anonymized or underlying data. The report can indicate a semantic attribute relating to a semantic nature of one or more of the anonymized data. For example, the report can indicate a semantic identifier, such as whether the anonymized data corresponds to a name, to a physical address, to an email address, etc. Semantic attributes can include semantic identifiers or other semantic attributes, such as a contextual relevance of the entity, a sensitivity level of the entity, an intended purpose of the entity, a degree of linkability of the entity to other sensitive data (e.g., personally identifying information), a data owner or subject associated with the entity, a temporal aspect of the entity (e.g., past email address, present email address), or a legal significance of the entity (e.g., under which regulatory or statutory requirement the data is protected), or a relationship to other entities. The report can associate corresponding semantic identifiers to anonymized or remaining targeted data entries.

The anonymizing system 100 can include an auditor 124 that includes a component for a data redaction service. The auditor 124 can provide accountability, transparency, or security to the data within the anonymizing system 100. For example, the auditor 124 can record access to the anonymized (e.g., censor, de-identify, redact, etc.) data, such as user identity, timestamp, actions performed, or similar. Additionally or alternatively, the auditor 124 can maintain a history of anonymization activities performed by one or more elements of the anonymizing system 100. For example, the auditor 124 can record which parts of the data (e.g., the entities, the tags) were redacted, by what, or when.

The config 128 can be in communication with one or more of the natural language processor 108, the orchestrator 112, the decider 116, or the anonymizer 120. The anonymizer 120 can support defining or parsing of settings that can be used to drive other modules of the anonymizing system 100. The config 128 can store a list of supported entities or corresponding detectors for entity detection. The config 128 can allow a user or the anonymizing system 100 to modify one or more detector settings, such as a name, a type, confidence scores, confidence score thresholds, attributes, etc. associated with the anonymized data. In some embodiments, the config 128 can maintain a report of the mapping between the anonymized data and the underlying data.

Use of a config 128 can be an alternative to hard-coding settings for the detectors described herein. For example, the config 128 can assign or determine which detectors are to be used for which entity detection. Thus, the config 128 can allow for configuration-driven instantiation or use of detectors. This can offer a number of technical advantages over hard-coded dependency injection. For example, the config 128 can allow for a concise view of the system available via a single or a small number of config files. Additionally or alternatively, the config 128 can be configured to turn on a detector in stages for testing until it is ready for production. Additionally or alternatively, the config 128 can allow for different configuration for aspects of the anonymizing system 100, such as a confidence score or pattern recognition for different applications within the anonymizing system 100. In some embodiments, a user can provide user selection of the config 128 via a separate configuration file to perform one of more functions of the config 128 described herein.

The config 128 can include a list of top-level element entities. Additionally or alternatively, the config 128 can allow for selection of one or more entity objects. For example, one or more items in the entities list produced by the natural language processor 108 can include an object with a plurality of properties, such as two that include a data type (e.g., string, integer, etc.) and detector type (e.g., list). In some embodiments, the config-driven nature of the config 128 can allow filters or detectors to be dynamically reconfigured without needing to redeploy the system. This adaptability can provide technical solutions for accommodating new data types in evolving data landscapes.

The config 128 can include a detectors list selectable by a user. Each detector in the detectors list can be an object with a plurality of properties, such as name (e.g., unique name that identifies a detector), score (e.g., confidence score assigned by the detector), enabled (e.g., a boolean value determining whether the detector is to be used), a type (e.g., pattern detector, remote text detector, bloom filter token detector, etc.), or one or more attributes of an object that includes specific properties depending on the type of the detector. In some embodiments, one or more detectors may have an optional context property, which can be a list of strings that is used by the context enhancer to boost score based on presence of certain words around the entity.

Figure 2:
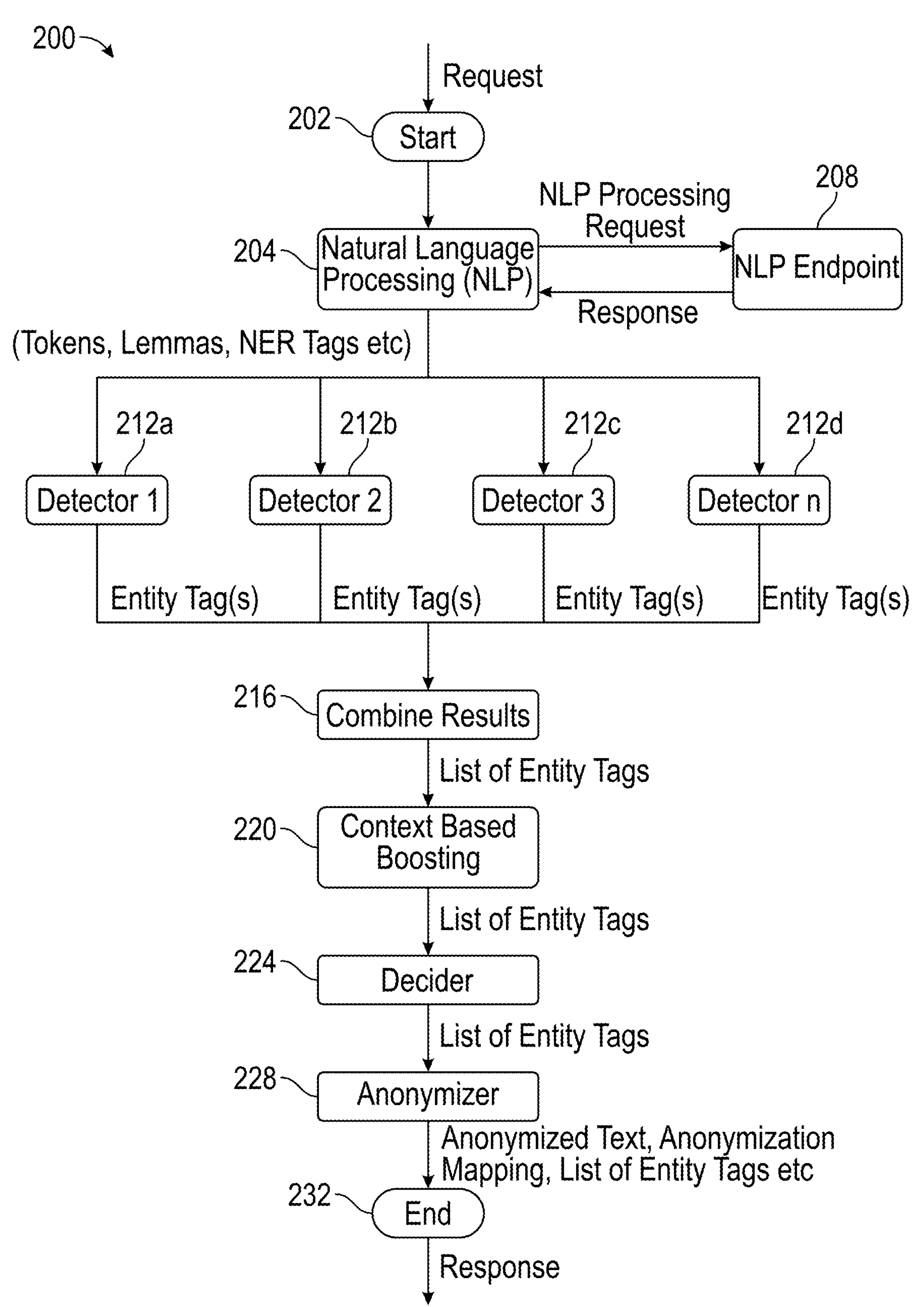
FIG. 2 depicts an example flowchart of data passing through anonymizing systems, according to example aspects of the present disclosure.

FIG. 2 depicts an example data flow 200 of data passing through anonymizing systems described herein, according to certain embodiments. The data flow 200 can begin at start 202, which is associated with a request to anonymize data. The data can be passed through natural language processing at operation 204. At operation 208 the natural language processing can include an NLP endpoint which results in a response that is passed to the natural language processor (e.g., the natural language processor 108). For example, the operation 208 can include generating tokens from the original text, tokenized into a list of strings. The endpoint can generate token indices, which can include a list of start indices for each token in the list of tokens. Additionally or alternatively, the endpoint can generate lemmas corresponding to lemmatized versions of words, including the base form of a word. For example the base form of "eating" would be "eat", "reading" would be "read", etc. These lemmas can be helpful in providing context later for other modules of the anonymizing system 100. The endpoint can identify keywords corresponding to a filtered down list of the lemmatized words from the original text that are not proper nouns or punctuation. These keywords can be used to enhance context detection. The endpoint can determine a plurality of entities using a Named-Entity-Recognition (NER) component that uses an NLP model to detect the entities. Examples of such entities include a person's name or phone number, and these entities can be returned during the response.

At operation 204 the natural language processing can identify one or more tokens, lemmas, NER tags, or other data entities. After the natural language processing at operation 204 and operation 208 is complete, the data can be passed through one or more detectors to detect relevant entities or other relevant data at operations 212*a*-212*d*. The detectors can identify different entities within the input data. In some embodiments, the detectors can attach an entity type to each entity. Additionally or alternatively, the detectors can assign a confidence score associated with each entity.

The detectors can each be associated with a certain type of data type (e.g., string, integer, float, etc.), an entity tag type (e.g., person, physical address, email address, telephone number, passport number, driver's license number, etc.), or a detector type (e.g., text-based, token-based, pattern text, remote text, bloom filter, etc.).

The one or more or detectors can be helpful in identifying the relevant data entities, providing confidence levels for the identified entities, supplying a location or type of the entities, and filtering the results. The detectors at operations 212*a*-212*d* can include one or more types of detectors, such as text-based detectors, which may analyze an entire input text and can detect multiple entities, or token-based detectors, which may analyze one or a few tokens at a time to detect a single entity.

Sub-types of these detectors may be used. For example, a remote text detector, pattern text detector, bloom filter token detector, or some custom detector may be used. A remote text detector can analyze an entire text remotely via a remote procedure call (RPC). This may include a machine learning-based NER system. Additionally or alternatively, the remote text detector can be time-bound in its execution. A pattern text detector can use regular expression (e.g., regex) patterns or other patterns within the input text to identify one or more entities. A pattern text detector can identify multiple types of patterns and may assign different confidence scores based on the pattern type. A pattern text detector may be particularly powerful for identifying email, social security number (SSN), passport number, or other similar entities.

Another detector that may be used at operations 212_a_-212_d_ includes a bloom filter token detector. The bloom filter can use probabilistic data structures for rapid detection of entities. In some embodiments, a bloom filter can store elements in a bit array and then use one or more hash functions to process the input elements to map each input element to a particular position in the bit array. The bloom filter can check the bits at the positions determined by the hash functions to determine whether an element in the input elements is probably in the set. Accordingly, the bloom filter can avoid returning false negatives, meaning that it is likely correct when it indicates that an element is not in the set. Thus, a bloom filter can be particularly advantageous for entity identification specific to a target domain (e.g., driver's license, vehicle identification number (VIN)).

In some embodiments, the system can receive (e.g., from a user) a set of filter sensitivities for one or more filters in the system. The system can apply the set of filter sensitivities to the one or more filters. The system may allow a user to select the filter sensitivities within a separate configuration file or specify which filters will be used in the filtering operations 212_a_-212_d_. In some embodiments, the system's real-time performance capabilities including parallel processing. For example, the system may achieve a P99 latency of less than about 800 ms or 95% accuracy. Such low latency and high accuracy can allow for real-time processing.

With continued reference to FIG. 2, at operation 216 the resulting data (e.g., entities, entity tags, etc.) from the operations 212_a_-212_d_ can be passed through operation 216 where results can be combined. In some cases, various filters may identify multiple entities associated with the same string. For example, the data entry "WASHINGTON STREET" overlaps with another data entry "GEORGE WASHINGTON", and both may be identified as entries for the same string "GEORGE WASHINGTON STREET". As a further example, the data entry "WASHINGTON" is contained in the data entry "WASHINGTON STREET", and each entity may be identified and returned by different filters. Such overlapping or contained data may be pruned during the combining of results at operation 216. Confidence scores for remaining entities may be increased at the conclusion of the combining of results at operation 216.

In some embodiments, at operation 220 the combined results can be boosted based on relevant context around the entities within the input data. The boosting can be applied to an associated confidence score based on the context around the entity. Additional details related to the context boosting are described below (e.g., the context booster 316 of FIG. 3). For example, the system can determine a number of context elements that are within a threshold number of elements from the targeted data entry. The context elements can include other data entries, entity tags, or other context elements having a semantic attribute that may be relevant to the boosting. The system can determine an associated tag type for one or more of the context elements and modify a confidence score of the targeted data entry. Modifying the confidence score may be based on a number of determined context elements or based on the tag type of the one or more context elements. Determining a confidence score may include integrating NLP techniques described herein or pattern-matching. This can enable more dynamic context assessment, improved detection accuracy, particularly in ambiguous or semi-structured data where pattern-based methods alone may fall short.

At operation 224 the data (e.g., entities, entity tags, confidence score, etc.) can be passed through a decider (e.g., the decider 116). As described above, the decider can decide which entities should be anonymized based on the combined results and the context-based boosting. The decider may determine that certain entities should not be anonymized due to a confidence score being below a certain confidence threshold (e.g., threshold confidence score). In some embodiments, the decider can remove entities that are duplicative (e.g., overlapping, contained) if they were not previously removed.

At operation 228, the data (e.g., remaining entities, remaining entity tags) can be passed to an anonymizer (e.g., the anonymizer 120). The anonymizer can exchange the entity data with anonymized data, such as masked or redacted data. For example, the anonymizer may replace "Sarah Johnson" with "PERSON_NAME_1". In some embodiments, the anonymizer retains information associated with the underlying data, such as the entity type (e.g., person name). The anonymized entities can be output as a response at the end 232. In some embodiments, the operation 228 can include mapping the underlying entity data to the anonymized data and generating an indication (e.g., report) of the mapping. This generated indication of the mapping can be output as part of the response. In some embodiments, the system can handle end-to-end anonymization in a fully automated manner, from raw data input to final anonymized output, without the need for manual intervention. This makes the system suitable for large-scale data environments.

Figure 3:
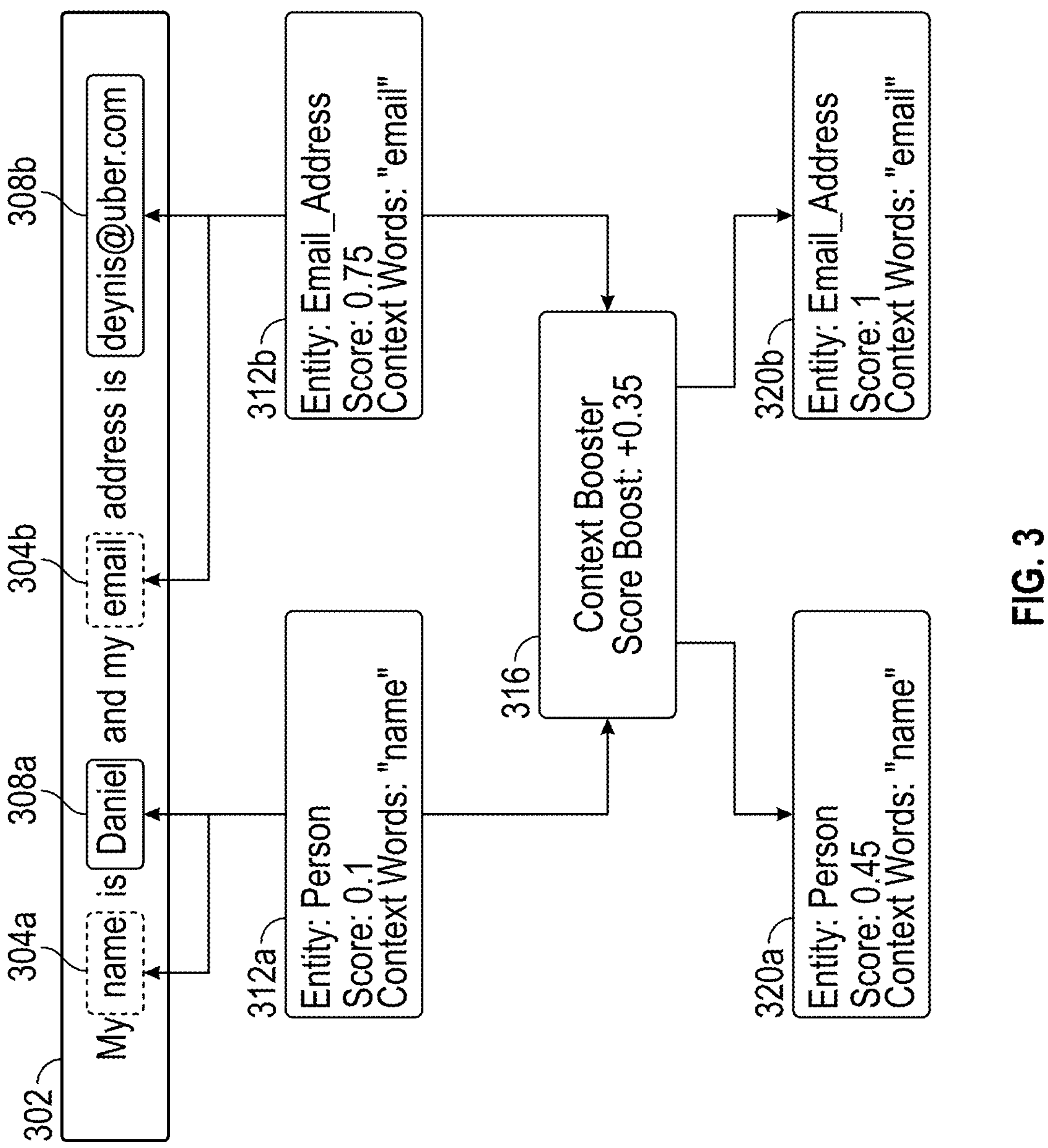
FIG. 3 depicts an example context-based boosting elements, according to example aspects of the present disclosure.

FIG. 3 depicts example context-based boosting elements, according to certain embodiments. As shown, in FIG. 3, a plurality of context elements 304_a_, 304_b_ are identified within a database 302 (e.g., a string), perhaps by the orchestrator 112 or the decider 116.

These context elements 304_a_, 304_b_ may be identified entities from the natural language processor 108, but in many cases the context elements 304_a_, 304_b_ are not identified as entities (although they may be identified as one or more tokens, lemmas, etc.).

The context elements 304_a_, 304_b_ can provide context for one or more of the targeted data entities 308_a_, 308_b_. The targeted data entities 308_a_, 308_b_ may correspond, for example, to sensitive data entities. The first context element 304_a_ may provide an indication that the first targeted data entity 308_a_ is an entity type of "PERSON". However, with only limited context elements, the system may assign the first targeted data entity 308_a_ a confidence score of 0.1 due to the context word of "name". Additionally or alternatively, the system may assign the second targeted data entity 308_b_ a confidence score of 0.75 that the second targeted data entity 308_b_ is an email address, in part based on the context word "email". However, when combining the first targeted data entry box 312_a_ with the second targeted data entry box 312_b_, the system may boost the confidence score of both entities at the context booster 316 by, for example, up to 0.35. Resulting boosted targeted data entry boxes 320_a_, 320_b_ indicate that the new confidence score of the first targeted data entity 308_a_ is 0.45 and that the new confidence score of the second targeted data entity 308_b_ is 1. Accordingly, use of context boosting can reduce and even avoid Type II errors (e.g., false negatives).

Figure 4:
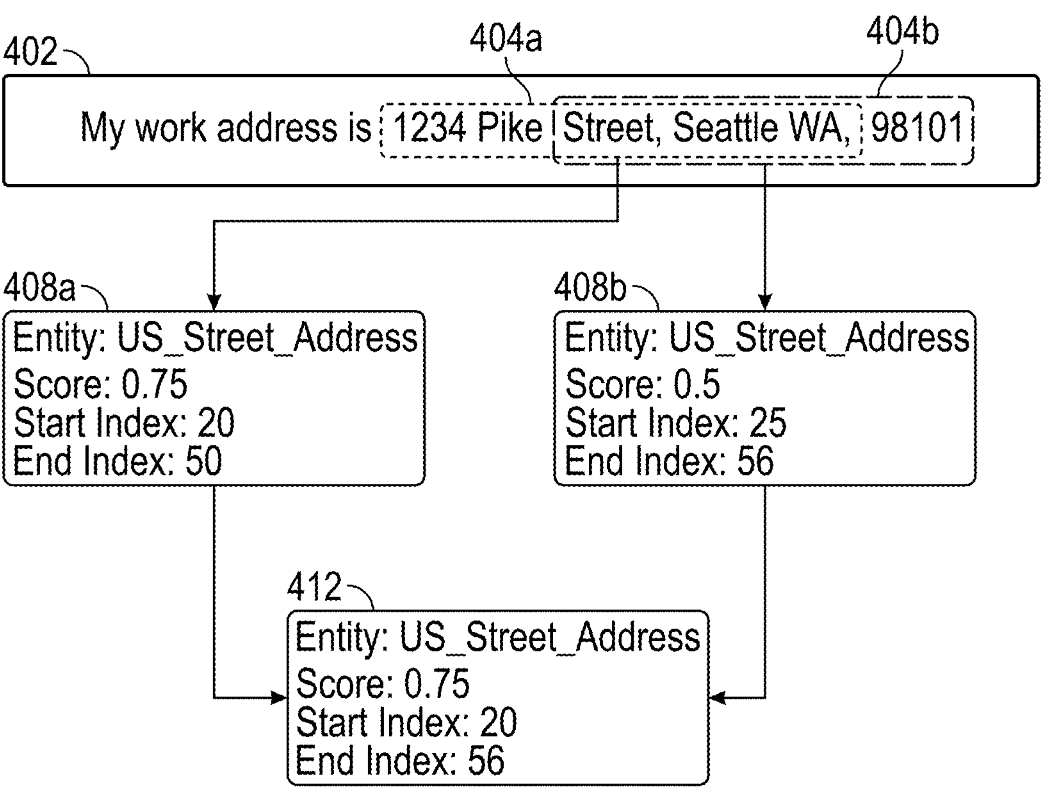
FIG. 4 depicts an example aspect of a decider, according to example aspects of the present disclosure.
Figure 5:
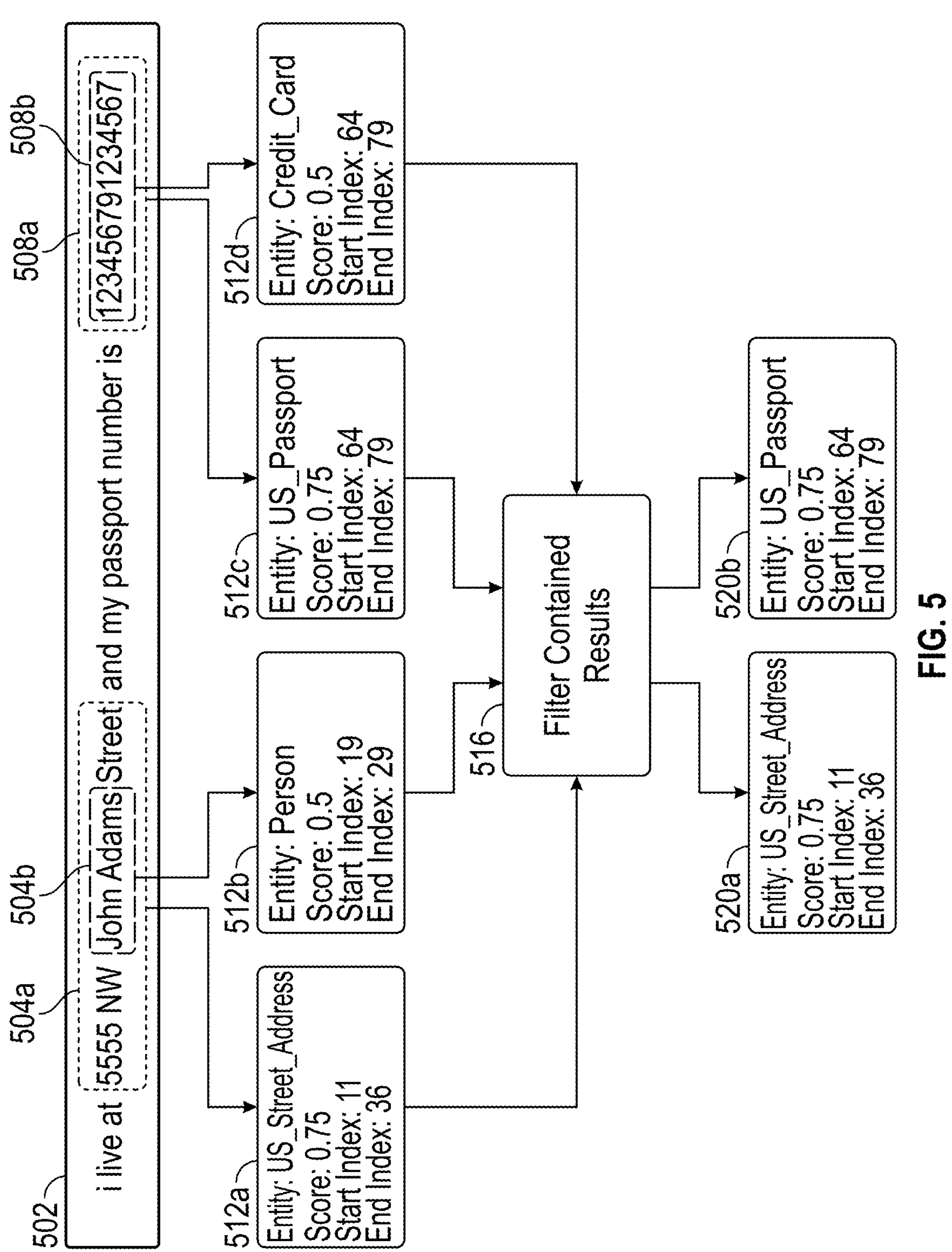
FIG. 5 depicts another example aspect of a decider, according to example aspects of the present disclosure.

FIGS. 4-5 depict example aspects of a decider, according to some embodiments. FIG. 4 depicts an example operation for combining two overlapping entities. As shown, the system has identified two overlapping targeted data entries 404_a_, 404_b_ within a database 402. The first overlapping targeted data entry 404_a_ corresponds to "1234 Pike Street, Seattle, WA", and the second overlapping targeted data entry 404_b_ corresponds to "Street, Seattle, WA, 98101". Resulting targeted data entry boxes 312*a*, 408*b* are shown, including the resulting entities, confidence scores, start indices, and end indices. The combiner can determine that the two overlapping targeted data entries 404*a*, 404*b* are in fact overlapping. This determination may be based on, for example, a degree of overlap. The degree of overlap may correspond to a percentage of characters within each original overlapping targeted data entry 404*a*, 404*b* that overlaps, a raw number of overlapping characters, or a proximity of the start indices or end indices (e.g., difference between start indices, difference between end indices). The system can output a resulting consolidated data entry box 412 with the entity, confidence score, start index, and end index.

FIG. 5 depicts an example combining of contained entities. As shown, the system has identified two sets of contained entities, including the targeted data entries 504*a*, 504*b* and the targeted data entries 508*a*, 508*b*, within the database 502. The containing targeted data entry 504*a* corresponds to "5555 NW John Adams Street" and the contained targeted data entry 504*b* corresponds to "John Adams". The first targeted data entry box 512*a* corresponds to the containing targeted data entry 504*a*, and the second targeted data entry box 512*b* corresponds to the contained targeted data entry 504*b*. The first targeted data entry box 512*a* properly identifies a tag type of the containing targeted data entry 504*a* as a US street address. However, the second targeted data entry box 512*b* erroneously identifies the contained targeted data entry 504*b* as a person tag type. The data of the targeted data entry boxes 512*a*, 512*b* for these two targeted data entries 504*a*, 504*b* are passed through the decider (e.g., the decider 116) to result in a first consolidated data entry box 520*a*. During consolidation, the decider determined (correctly) that the contained targeted data entry 504*b* was not a unique person-type entity but rather a contained data entry within the containing targeted data entry 504*a*. Thus, only the remaining US-street-address-type passes through the decider.

Similarly, the system identifies the first targeted data entry 508*a* as a US passport number, while also identifying the same second targeted data entry 508*b* (erroneously) as a credit card number, as indicated by the respective targeted data entry boxes 512*c*, 512*d*. The data associated with these targeted data entry boxes 512*c*, 512*d* is passed through the decider, which properly identifies that the correct entity is the US passport entity and outputs the second consolidated data entry box 520*a*. The decider may rely, for example, on context elements (as described above) to make this determination. Additionally or alternatively, the decider may use a confidence score of each of the targeted data entries 508*a*, 508*b* in making the determination.

Figure 6:
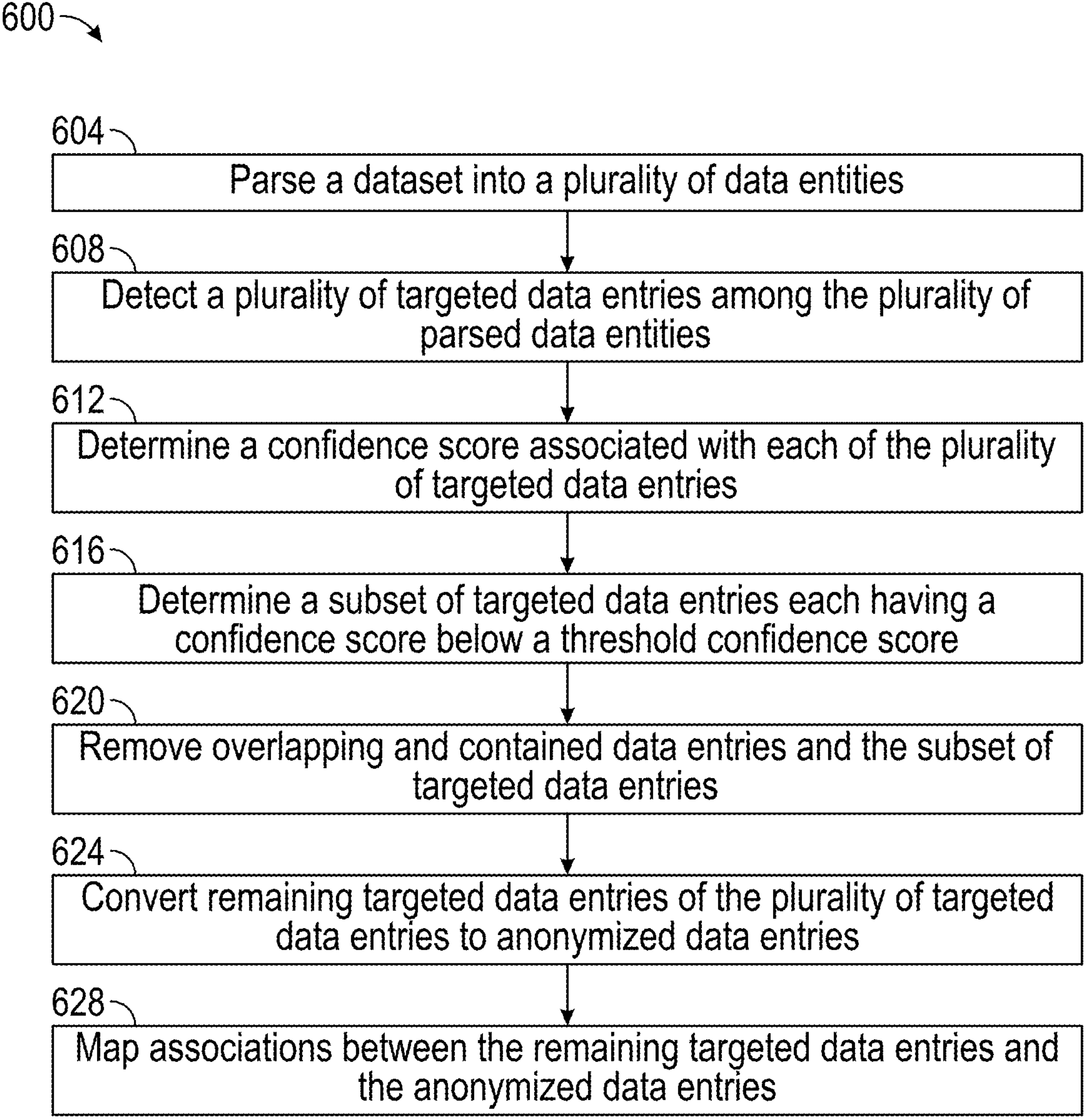
FIG. 6 shows an example method, according to example aspects of the present disclosure.
Figure 7:
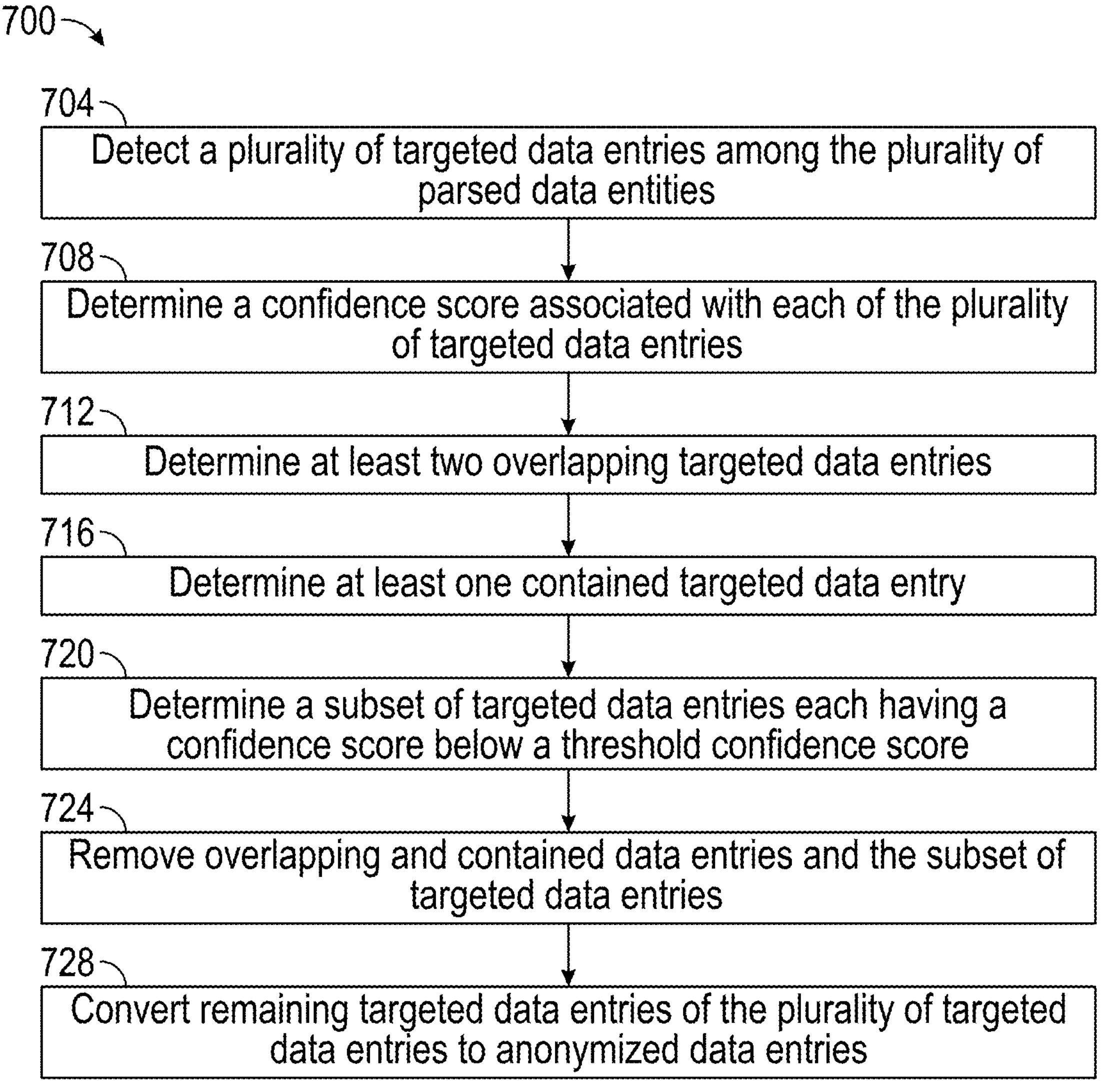
FIG. 7 shows another example method, according to example aspects of the present disclosure.

FIGS. 6 and 7 depict example methods, according to some embodiments. One or more portion(s) of the methods can be implemented by one or more computing devices such as, for example, the computing devices/systems described here. Moreover, one or more portion(s) of the methods can be implemented as an algorithm on the hardware components of the device(s) described herein (e.g., as in FIG. 1, FIG. 8). For example, a computing system can include one or more processors and one or more non-transitory, computer-readable media storing instructions that are executable by the one or more processors to cause the computing system to perform operations, the operations including one or more of the operations/portions of the methods of FIGS. and 7.

FIGS. 6 and 7 depict elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

FIG. 6 shows an example method 600, according to some embodiments. The method 600 can be performed by one or more systems described herein, such as the anonymizing system 100. The method 600 can include accessing a dataset that includes targeted data, such as sensitive data. The dataset can include, for example, "I live at 5555 NW John Adams Street and my passport number is 1234567891234567". At operation 604, the system can parse the dataset into a plurality of data entities. At operation 608, the system can detect a plurality of targeted data entries among the plurality of parsed data entities. For example, the system may parse the dataset into "5555 NW John Adams Street", "John Adams", "1234567891234567", and "1234567891234567". The targeted data may be detected using one or more filters.

At operation 612 the system may determine a confidence score associated with each of the plurality of targeted data entries. Determining the confidence score can include identifying at least one entity type associated with the respective targeted data entries. For example, the system can add a confidence score of 0.75 to "5555 NW John Adams Street" (for US street address), a confidence score of 0.5 to "John Adams" (for person), a confidence score of 0.75 to "1234567891234567" (for US passport number), and a confidence score of 0.5 to "1234567891234567" (for credit card number). Additionally or alternatively, the system can transmit the at least one entity type or the respective targeted data entries to a trained model. In some embodiments, the system can receive the confidence score associated with the respective targeted data entry of the plurality of targeted data entries, from the trained model.

The confidence scores or the targeted data entries may be generated using one or more machine-learned (or machine-learning) models. In some implementations, the machine-learned models described herein can be trained at a training computing system and then provided for storage or implementation at one or more computing devices, as described above. For example, a model trainer can be located at the training computing system. The training computing system can be included in or separate from the one or more computing devices that implement the machine-learned model. In some implementations, the model can be trained in an offline fashion or an online fashion. In offline training (also known as batch learning), a model is trained on the entirety of a static set of training data. In online learning, the model is continuously trained (or re-trained) as new training data becomes available (e.g., while the model is used to perform inference).

In some implementations, the model trainer can perform centralized training of the machine-learned models (e.g., based on a centrally stored dataset). In other implementations, decentralized training techniques such as distributed training, federated learning, or the like can be used to train, update, or personalize the machine-learned models.

The machine-learned models described herein can be trained according to one or more of various different training types or techniques. For example, in some implementations, the machine-learned models can be trained using supervised learning, in which the machine-learned model is trained on a training dataset that includes instances or examples that have certain features of interest, such as tag-types associated with various entries. The features can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

In some implementations, training data can include examples of the input data that have been assigned labels associated with the features that correspond to output data. For example, determining the targeted data entries can be performed using a machine-learned model that is trained using training data with targeted data gathered by the computing system. The targeted data can include category or feature labels (e.g., machine learning based prediction of tag-type) or entry-related features.

In some implementations, during training, the input training data can be intentionally deformed in any number of ways to increase model robustness, generalization, or other qualities. In some implementations, the machine-learned model can be trained by optimizing an objective function. For example, in some implementations, the objective function can be or include a loss function that compares (e.g., determines a difference between) output data generated by the model from the training data and the labels associated with the training data. For example, the loss function can evaluate a sum or mean of squared differences between the output data and the labels. As another example, the objective function can be or include a cost function that describes a cost of a certain outcome or output data. Other objective functions can include margin-based techniques such as, for example, triplet loss or maximum-margin training.

One or more of various optimization techniques can be performed to optimize the objective function. For example, the optimization technique(s) can minimize or maximize the objective function. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train a model (e.g., a multi-layer model such as an artificial neural network). For example, an iterative cycle of propagation and model parameter (e.g., weights) update can be performed to train the model. Example backpropagation techniques include truncated backpropagation through time, Levenberg-Marquardt backpropagation, etc.

In some implementations, the machine-learned models described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

In some implementations, the machine-learned models described herein can be trained using semi-supervised techniques which combine aspects of supervised learning and unsupervised learning. In some implementations, the machine-learned models described herein can be trained or otherwise generated through evolutionary techniques or genetic algorithms.

In some implementations, the machine-learned models described herein can be trained using reinforcement learning. In reinforcement learning, an agent (e.g., model) can take actions in an environment and learn to maximize rewards or minimize penalties that result from such actions. Reinforcement learning can differ from the supervised learning problem in that correct input/output pairs are not presented, nor sub-optimal actions explicitly corrected.

In some implementations, one or more generalization techniques can be performed during training to improve the generalization of the machine-learned model. Generalization techniques can help reduce overfitting of the machine-learned model to the training data. Example generalization techniques include dropout techniques; weight decay techniques; batch normalization; early stopping; subset selection; stepwise selection; etc.

In some implementations, the machine-learned models described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search); gradient-based optimization; etc. Example techniques or tools for performing automatic hyperparameter optimization include Hyperopt; Auto-WEKA; Spearmint; Metric Optimization Engine (MOE); etc.

In some implementations, various techniques can be used to optimize or adapt the learning rate when the model is trained. Example techniques or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of the machine-learned models described herein.

With continued reference to FIG. 6, at operation 616, the system can determine a subset of targeted data entries each having a confidence score below a threshold confidence score. The threshold confidence score may be about 0.5, about 0.6, about 0.65, about 0.7, about 0.75, about 0.8, about 0.9, about 0.95, any score therebetween, or have a score falling within a range having any score therein as endpoints. The threshold confidence scores above may refer to corresponding percentages. In some embodiments, the threshold confidence score is 0.7 (e.g., corresponding to a percentage of 70%).

At operation 620, the system can remove the subset of targeted data entries from the plurality of targeted data entries. For example, the system may remove "John Adams" (for name) and "1234567891234567" (for US passport number) because the associated confidence scores are below a threshold (e.g., below 0.7). The remaining targeted data entries of the plurality of targeted data entries can be converted to anonymized data entries at operation 624. Each of the anonymized data entries may be configured to be devoid of the targeted (e.g., sensitive) data. In some embodiments, at operation 628, the system can map associations between the remaining targeted data entries and the anonymized data entries. For example, the system may anonymize "5555 NW John Adams Street" to "US_Street_Address_1" or similar. The anonymized entry can indicate a tag type, as in the example here. In some embodiments, the system preserves the utility of anonymized data.

While anonymization ensures privacy, the system can ensure that statistical properties (e.g., distributions, correlations, trends) and cross-dataset relationships are maintained. Maintaining these statistical properties can be beneficial, for example, in use cases like machine learning model training and data analysis, where anonymized datasets may retain the underlying structure or statistical relationships to retain their usefulness for modeling and predictions.

In some embodiments, the system can identify a semantic attribute of each of the targeted data entries. A semantic attribute can describe a meaning or context-specific significance of the data entries. These attributes can go beyond the raw data values to describe what the data represents, how it should be interpreted, or the role it plays within the dataset. Example semantic attributes can include a data label of the data entry, a data type, one or more context elements, a relationship established among two or more data entries, hierarchical or structural information about the data entry, domain-specific information about the data entry (e.g., relating to healthcare, relating to government documents, etc.), or other semantic attributes. For example, a semantic attribute of "5555 NW John Adams Street" may be a semantic identifier, such as that it is a street address. Other semantic attributes include that it describes where the speaker lives, that it is associated with the US passport number 1234567891234567, etc. When converting the remaining targeted data entries of the plurality of targeted data entries to the anonymized data entries, the system may associate at least one corresponding semantic identifier to each of the remaining targeted data entries, based on the respective semantic attribute. An example semantic identifier can include a tag-type associated with a data entry, such as an identified entity.

In some embodiments, the system can identify a semantic relationship between a first targeted data entry and a second targeted data entry, based on the semantic attribute of the first targeted data entry. For example, the system may use a context booster to increase (or decrease) a confidence score of the second targeted data entry.

FIG. 7 shows another example method 700, according to some embodiments. The method 700 can be performed by one or more systems described herein, such as the anonymizing system 100. The method 700 can include accessing a dataset that includes targeted data, such as sensitive data. The dataset can include, for example, "I live at 5555 NW John Adams Street and my passport number is 1234567891234567". In some embodiments, the system can parse the dataset into a plurality of data entities. Parsing the dataset into the plurality of data entities can include parsing the dataset into a plurality of tokens, lemmas, or keywords. In some embodiments, parsing the dataset into the plurality of data entities includes detecting contextual information within the dataset using Named-Entity-Recognition (NER). The system may accept or identify multiple types of data formats beyond structured text, including, for example, semi-structured (e.g., JSON), unstructured (e.g., logs, free text), and media (e.g., images, videos) data formats. This may be beneficial because alternative anonymization systems often focus primarily on structured data only.

At operation 704, the system can detect a plurality of targeted data entries among the plurality of parsed data entities. For example, the system may parse the dataset into "5555 NW John Adams Street", "John Adams", "1234567891234567", and "1234567891234567". The targeted data may be detected using one or more filters. For example, in some embodiments the filter can hash each targeted data entry with a plurality of hash functions and assign a value to corresponding bits in a bit array based on the plurality of hash functions. Additionally or alternatively, the filter can determine the plurality of targeted data entries using the value of corresponding bits in the bit array.

At operation 708 the system may determine a confidence score associated with each of the plurality of targeted data entries. For example, the system can add a confidence score of 0.75 to "5555 NW John Adams Street" (for US street address), a confidence score of 0.5 to "John Adams" (for person), a confidence score of 0.75 to "1234567891234567" (for US passport number), and a confidence score of 0.5 to "1234567891234567" (for credit card number). In some embodiments, this can be done by passing the plurality of targeted data entries into a trained model that can determine one or more features associated with one or more of the plurality of targeted data entries that makes that targeted data entry more or less likely to include targeted data. Additionally or alternatively, determining the confidence score can include determining one or more context elements within a threshold number of elements from the respective targeted data entry, for each of the plurality of targeted data entries. It may further include determining an associated tag type for each of the one or more context elements or modifying the confidence score of the corresponding targeted data entry, based on a number of determined context elements or based on the tag type of the one or more context elements.

At operation 712, the system can determine at least two overlapping targeted data entries. Each overlapping targeted data entry can include targeted data entries. For example, the two overlapping targeted data entries can include a word, phrase, or number that is shared between the two overlapping targeted data entries.

At operation 716, the system can determine at least one contained targeted data entry. The at least one contained targeted data entry can include a portion of a related (e.g., containing) targeted data entry. For example, a contained targeted data entry can include a subset of characters of the related data entry.

At operation 720, the system can determine a subset of targeted data entries each having a confidence score below a threshold confidence score. For example, the system may remove "John Adams" (for name) and "1234567891234567" (for US passport number) because the associated confidence scores are below a threshold (e.g., below 0.6).

At operation 724, the system can remove one or more targeted entries from the plurality of targeted data entries. For example, the system may remove one or more of the at least two overlapping targeted data entries, the at least one contained targeted data entry, or the subset of targeted data entries. At operation 728, the system can convert remaining targeted data entries of the plurality of targeted data entries to anonymized data entries. Each of the anonymized data entries can be devoid of the targeted (e.g., sensitive) data.

In some embodiments, the system can identify a semantic attribute of each of the targeted data entries. Additionally or alternatively, the system can associate at least one corresponding semantic identifier to each of the remaining targeted data entries, based on the respective semantic attribute. In some embodiments, the system can identify a semantic relationship between a first targeted data entry and a second targeted data entry, based on the semantic attribute of the first targeted data entry.

In some embodiments, the system can map associations between the remaining targeted data entries and the anonymized data entries. Additionally or alternatively, the system can generate data indicating the associations between the remaining targeted data entries and the anonymized data entries. This data may include a report that maps the associations.

The system can receive (e.g., from a user selection, from a received computer command) a set of filter sensitivities associated with each respective filter of the one or more filters. This can allow the system to detect the plurality of targeted data entries among the plurality of parsed data entities by applying the set of filter sensitivities to the one or more filters.

In some embodiments, the system accesses, within a separate configuration file, one or more detectors configured to detect the plurality of targeted data entries among the plurality of parsed data entities. This separate configuration file may correspond to the config 128 described above. In some embodiments, the system can receive, via the separate configuration file, user selection configured to update the one or more detectors. The system can update the one or more detectors based on the user selection. This may differ from and provide technical improvements over hard-coded system configurations, such as allowing modifications to the separate configuration file without disturbing other attributes of the system.

Figure 8:
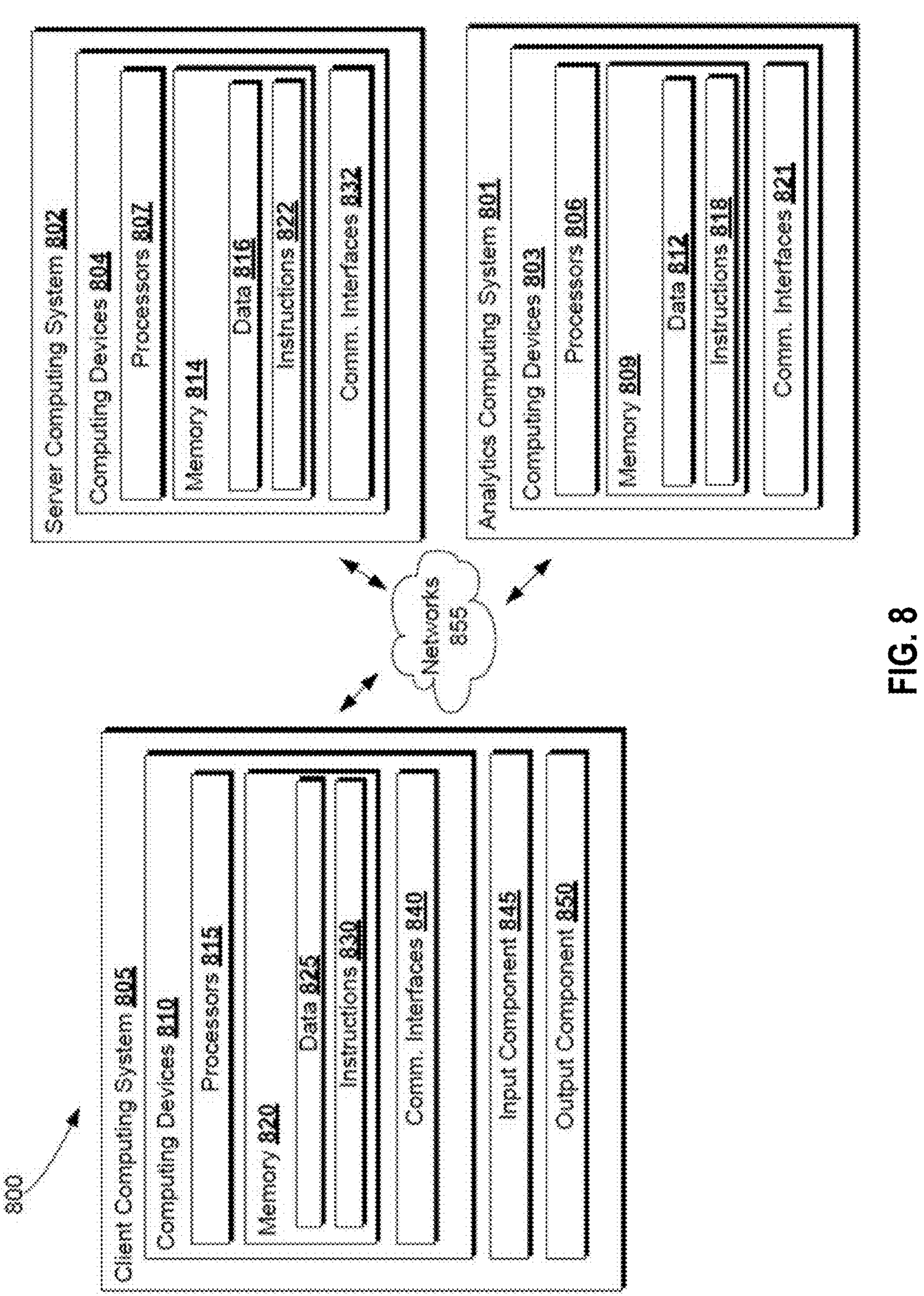
FIG. 8 depicts an example computing ecosystem, according to example aspects of the present disclosure.

FIG. 8 depicts a block diagram of an example system 800 for implementing systems and methods according to example embodiments of the present disclosure. The example system 800 illustrated in FIG. 8 is provided as an example only. The components, systems, connections, or other aspects illustrated in FIG. 8 are optional and are provided as examples of what is possible, but not required, to implement the present disclosure. The example system 800 can include an application computing system 805 (e.g., applications 103A-F, application 401, etc.). The example system 800 can include a server computing system 802. The example system 800 can include an analytics computing system 801 (e.g., analytical computing system 307, etc.). One or more of the application computing systems 805, the server computing system 802, or the analytics computing system 801 can be communicatively coupled to one another over one or more communication network(s) 855. The networks 855 can correspond to any of the networks described herein.

The computing device(s) 810 of the application computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For example, the memory 820 (e.g., one or more non-transitory computer-readable storage mediums, memory devices, etc.) can include computer-readable instructions 1330A that can be executed by the one or more processors 815. The instructions 830 can be software written in any suitable programming language or can be implemented in hardware. Additionally, or alternatively, the instructions 830 can be executed in logically or virtually separate threads on processor(s) 815.

For example, the memory 820 can store instructions 830 that when executed by the one or more processors 815 cause the one or more processors 815 (e.g., of the application computing system 805, etc.) to perform operations such as any of the operations and functions of the computing system(s) (e.g., operations computing system, etc.) described herein (or for which the system(s) are configured), one or more of the operations and functions for communicating between the computing systems, one or more portions/operations of method 700, or one or more of the other operations and functions of the computing systems described herein.

The memory 820 can store processors 815 that can be obtained (e.g., acquired, received, retrieved, accessed, created, stored, etc.). The data 825 can include, for example, any of the data/information described herein. In some implementations, the computing device(s) 810 can obtain data from one or more memories that are remote from the application computing system 805.

The computing device(s) 805 can also include a communication interface 840 used to communicate with one or more other system(s) remote from the application computing system 805, such as server computing system 802, or the analytics computing system 801. The communication interface 840 can include any circuits, components, software, etc. for communicating via one or more networks (e.g., network(s) 855, etc.). The communication interface 840 can include, for example, one or more of a communications controller, receiver, transceiver, transmitter, port, conductors, software or hardware for communicating data.

The server computing system 802 can include one or more computing device(s) 804 that are remote from the application computing system 805 and the analytics computing system 801. The computing device(s) 804 can include one or more processors 807 and a memory 814. The one or more processors 807 can be any suitable processing device (e.g., a processor core, a microprocessor, an ASIC, a FPGA, a controller, a microcontroller, etc.) and can be one processor or a plurality of processors that are operatively connected. The memory 814 can include one or more tangible, non-transitory computer-readable storage media, such as RAM, ROM, EEPROM, EPROM, one or more memory devices, flash memory devices, data registrar, etc., and combinations thereof.

The memory 814 can store information that can be accessed by the one or more processors 807. For example, the memory 814 (e.g., one or more tangible, non-transitory computer-readable storage media, one or more memory devices, etc.) can include computer-readable instructions 822 that can be executed by the one or more processors 807. The instructions 822 can be software written in any suitable programming language or can be implemented in hardware. Additionally, or alternatively, the instructions 822 can be executed in logically or virtually separate threads on processor(s) 807.

For example, the memory 814 can store instructions 822 that when executed by the one or more processors 807 cause the one or more processors 807 to perform operations such as any of the operations and functions of the computing system(s) (e.g., advertisement server, etc.) described herein (or for which the system(s) are configured), one or more of the operations and functions for communicating between computing systems, one or more portions/operations of methods 600/700 or one or more of the other operations and functions of the computing systems described herein. The memory 814 can store data 816 that can be obtained. The data 816 can include, for example, any of the data/information described herein.

The computing device(s) 804 can also include a communication interface 832 used to communicate with one or more system(s) that are remote from the system 802. The communication interface 832 can include any circuits, components, software, etc. for communicating via one or more networks (e.g., network(s) 855, etc.). The communication interface 832 can include, for example, one or more of a communications controller, receiver, transceiver, transmitter, port, conductors, software or hardware for communicating data.

The analytics computing system 801 can include one or more computing device(s) 803 that are remote from the application computing system 805 and the server computing system 802. The computing device(s) 803 can include one or more processors 806 and a memory 809. The one or more processors 806 can be any suitable processing device (e.g., a processor core, a microprocessor, an ASIC, a FPGA, a controller, a microcontroller, etc.) and can be one processor or a plurality of processors that are operatively connected. The memory 809 can include one or more tangible, non-transitory computer-readable storage media, such as RAM, ROM, EEPROM, EPROM, one or more memory devices, flash memory devices, data registrar, etc., and combinations thereof.

The memory 809 can store information that can be accessed by the one or more processors 806. For example, the memory 809 (e.g., one or more tangible, non-transitory computer-readable storage media, one or more memory devices, etc.) can include computer-readable instructions 818 that can be executed by the one or more processors 806. The instructions 818 can be software written in any suitable programming language or can be implemented in hardware. Additionally, or alternatively, the instructions 818 can be executed in logically or virtually separate threads on processor(s) 806.

For example, the memory 809 can store instructions 818 that when executed by the one or more processors 806 cause the one or more processors 806 to perform operations such as any of the operations and functions of the computing system(s) (e.g., user devices, etc.) described herein (or for which the user device(s) are configured), one or more of the operations and functions for communicating between systems, one or more portions/operations of methods 600/700 or one or more of the other operations and functions of the computing systems described herein. The memory 809 can store data 812 that can be obtained. The data 812 can include, for example, any of the data/information described herein.

The computing device(s) 803 can also include a communication interface 821 used to communicate computing device/system that is remote from the analytics computing system 801, such as server computing system 802 or application computing system 805. The communication interface 821 can include any circuits, components, software, etc. for communicating via one or more networks (e.g., network(s) 855, etc.). The communication interface 821 can include, for example, one or more of a communications controller, receiver, transceiver, transmitter, port, conductors, software or hardware for communicating data.

The network(s) 855 can be any type of network or combination of networks that allows for communication between devices. In some implementations, the network(s) 855 can include one or more of a local area network, wide area network, the Internet, secure network, cellular network, mesh network, peer-to-peer communication link or some combination thereof and can include any number of wired or wireless links. Communication over the network(s) 855 can be accomplished, for example, via a communication interface using any type of protocol, protection scheme, encoding, format, packaging, etc.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" can be used interchangeably herein. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral, for example illustrated purposes and are not meant to be limiting.

What is claimed is:

1. A computing system comprising:

one or more processors;

one or more non-transitory computer readable media storing instructions that are executable by the one or more processors to perform operations, the operations comprising:

accessing a dataset comprising targeted data;

parsing the dataset into a plurality of data entities;

detecting, using one or more filters, a plurality of targeted data entries among the plurality of data entities;

determining a confidence score associated with each of the plurality of targeted data entries;

determining at least two overlapping targeted data entries, wherein each overlapping targeted data entry comprises targeted data entries;

determining at least one contained targeted data entry, wherein the at least one contained targeted data entry comprises a portion of a related targeted data entry;

determining a subset of targeted data entries each having a confidence score below a threshold confidence score;

removing, from the plurality of targeted data entries:

(i) one or more of the at least two overlapping targeted data entries;

(ii) the at least one contained targeted data entry; and (iii) the subset of targeted data entries; and converting remaining targeted data entries of the plurality of targeted data entries to anonymized data entries, wherein each of the anonymized data entries is devoid of the targeted data.

2. The computer system of claim 1, wherein the operations comprise:

identifying a semantic attribute of each of the targeted data entries.

3. The computer system of claim 2, wherein converting the remaining targeted data entries of the plurality of targeted data entries to the anonymized data entries comprises associating, based on the respective semantic attribute, at least one corresponding semantic identifier to each of the remaining targeted data entries.

4. The computer system of claim 2, wherein the operations comprise:

identifying, based on the semantic attribute of a first targeted data entry, a semantic relationship between the first targeted data entry and a second targeted data entry.

5. The computer system of claim 1, wherein parsing the dataset into the plurality of data entities comprises parsing the dataset into a plurality of tokens, lemmas, or keywords.

6. The computer system of claim 1, wherein parsing the dataset into the plurality of data entities comprises detecting contextual information within the dataset using Named-Entity-Recognition (NER).

7. The computer system of claim 1, wherein determining the confidence score associated with each respective targeted data entry of the plurality of targeted data entries comprises:

identifying at least one entity type associated with the respective targeted data entries;

transmitting the at least one entity type and the respective targeted data entries to a trained model; and receiving, from the trained model, the confidence score associated with the respective targeted data entry of the plurality of targeted data entries.

8. The computer system of claim 1, wherein the operations comprise:

mapping associations between the remaining targeted data entries and the anonymized data entries; and generating data indicating the associations between the remaining targeted data entries and the anonymized data entries.

9. The computer system of claim 1, wherein the operations comprise:

receiving a set of filter sensitivities associated with each respective filter of the one or more filters, wherein detecting the plurality of targeted data entries among the plurality of data entities comprises applying the set of filter sensitivities to the one or more filters.

10. The computer system of claim 1, wherein the operations comprise:

accessing, within a separate configuration file, one or more detectors configured to detect the plurality of targeted data entries among the plurality of data entities.

11. The computer system of claim 10, wherein the operations comprise:

receiving, via the separate configuration file, user selection configured to update the one or more detectors; and updating, based on the user selection, the one or more detectors.

12. The computer system of claim 1, wherein detecting the plurality of targeted data entries among the plurality of data entities comprises:

hashing each targeted data entry with a plurality of hash functions;

assigning, based on the plurality of hash functions, a value to corresponding bits in a bit array; and determining, using the value of corresponding bits in the bit array, the plurality of targeted data entries.

13. The computer system of claim 1, wherein determining the confidence score associated with each of the plurality of targeted data entries comprises:

determining, for each of the plurality of targeted data entries, one or more context elements within a threshold number of elements from the respective targeted data entry;

determining, for each of the one or more context elements, an associated tag type; and modifying, based on a number of determined context elements or based on the tag type of the one or more context elements, the confidence score of the corresponding targeted data entry.

14. A computer-implemented method comprising:

accessing a dataset comprising targeted data;

parsing the dataset into a plurality of data entities;

detecting, using one or more filters, a plurality of targeted data entries among the plurality of data entities;

determining a confidence score associated with each of the plurality of targeted data entries;

determining a subset of targeted data entries each having a confidence score below a threshold confidence score;

removing, from the plurality of targeted data entries, the subset of targeted data entries;

converting remaining targeted data entries of the plurality of targeted data entries to anonymized data entries, wherein each of the anonymized data entries is devoid of the targeted data; and mapping associations between the remaining targeted data entries and the anonymized data entries.

15. The method of claim 14, comprising:

identifying a semantic attribute of each of the targeted data entries.

16. The method of claim 15, wherein converting the remaining targeted data entries of the plurality of targeted data entries to the anonymized data entries comprises associating, based on the respective semantic attribute, at least one corresponding semantic identifier to each of the remaining targeted data entries.

17. The method of claim 15, further comprising:

identifying, based on the semantic attribute of a first targeted data entry, a semantic relationship between the first targeted data entry and a second targeted data entry.

18. A computer-implemented method comprising:

parsing a dataset into a plurality of tokens, lemmas, or keywords;

generating a plurality of data entities based on the plurality of tokens, lemmas, or keywords;

detecting, using one or more filters, a plurality of targeted data entries among the plurality of data entities;

determining a confidence score associated with each of the plurality of targeted data entries;

determining a subset of targeted data entries each having a confidence score below a threshold confidence score;

removing, from the plurality of targeted data entries, the subset of targeted data entries;

converting remaining targeted data entries of the plurality of targeted data entries to anonymized data entries; and generating data indicating associations between the remaining targeted data entries and the anonymized data entries.

19. The method of claim 18, wherein detecting the plurality of targeted data entries among the plurality of data entities comprises:

hashing each targeted data entry with a plurality of hash functions; and assigning, based on the plurality of hash functions, a value to corresponding bits in a bit array; and determining, using the value of corresponding bits in the bit array, the plurality of targeted data entries.

20. The method of claim 18, wherein determining the confidence score associated with each of the plurality of targeted data entries comprises:

determining, for each of the plurality of targeted data entries, one or more context elements within a threshold number of elements from the respective targeted data entry;

determining, for each of the one or more context elements, an associated tag type; and modifying, based on a number of determined context elements or based on the tag type of the one or more context elements, the confidence score of the corresponding targeted data entry.

* * * * *